July 28, 1931. W. T. BARKER, JR 1,816,309
DELIVERY APPARATUS FOR MOLTEN GLASS
Filed April 13, 1926  3 Sheets-Sheet 1

Inventor:
William T. Barker, Jr.
by Robson D. Brown
Atty.

July 28, 1931.  W. T. BARKER, JR  1,816,309
DELIVERY APPARATUS FOR MOLTEN GLASS
Filed April 13, 1926  3 Sheets-Sheet 2
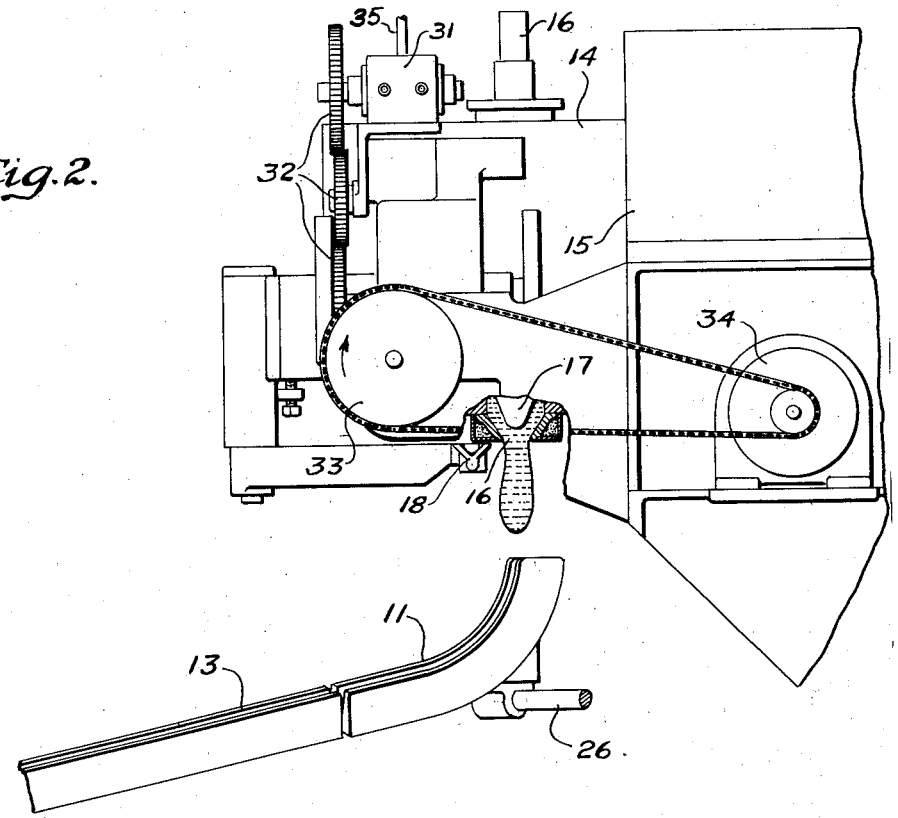
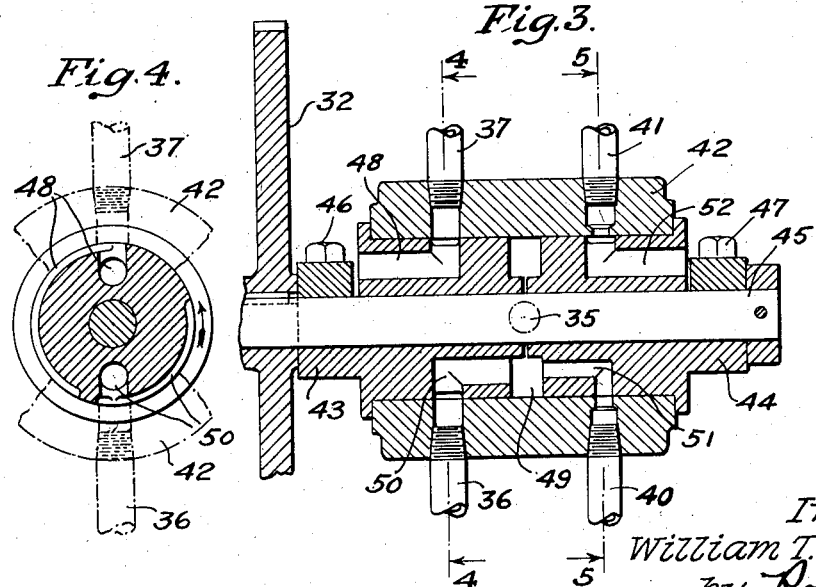
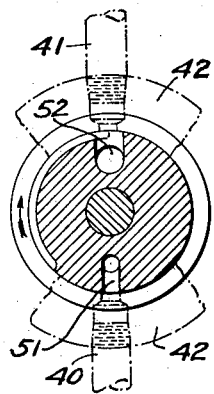
Inventor:
William T. Barker, Jr.
by Robson T. Brown
Atty Patented July 28, 1931

1,816,309

UNITED STATES PATENT OFFICE

WILLIAM T. BARKER, JR., OF HARTFORD, CONNECTICUT, ASSIGNOR TO HARTFORD-EMPIRE COMPANY, OF HARTFORD, CONNECTICUT, A CORPORATION OF DELAWARE

DELIVERY APPARATUS FOR MOLTEN GLASS

Application filed April 13, 1926. Serial No. 101,663.

My invention relates to apparatus for delivering mold charges of molten glass to the molds of glassware shaping machines, and it relates more particularly to mechanism adapted to deliver mold charges from one glass feeder to the molds of a plurality of shaping machines.

One object of my invention is to provide such glass-delivering apparatus with improved mechanism for operating a plurality of delivery devices, hereinafter called scoop blocks, in a desired sequence to receive mold charges of molten glass from the discharge outlet of an automatic feeder and to deliver the charges in proper order to designated molds of a plurality of shaping machines. This bject is accomplished by locating the scoop ilocks about the feeder outlet in any convc ent manner and mounting each scoop block upon a movable support which may be operated by a fluid-pressure mechanism to move the scoop block into and out of glass-receiving position.

More specifically, my invention contemplates mounting each scoop block upon the piston rod of a fluid-pressure cylinder which is positioned relative to the feeder so that the piston moves and guides the attached scoop block into alignment with the feeder outlet and into alignment with a trough section associated with one of the shaping machines. The arrangement and timing of the scoop blocks is such that, after one scoop has received and delivered a charge, it is then moved out of alignment with its corresponding trough and away from the feeder outlet in order to permit another scoop to be brought into glass-receiving position beneath the feeder outlet and into alignment with another trough section to deliver a mold charge to another shaping machine. In this way mold charges may be delivered to the molds of the several shaping machines in any desired sequence.

Another object of this invention is to provide an improved delivery apparatus which shall be pneumatically operated in synchronism with the several shaping machines and controlled by timing mechanism connected to the feeder mechanism.

Other objects of the invention include such novel features of construction and arrangement of parts as are disclosed in the following specification and drawings, and specifically set forth in the appended claims.

In the drawings:

Fig. 2 is a diagrammatic illustration of the apparatus shown in Fig. 1, in which a glass feeder is shown in operative relation to the delivery apparatus;

Fig. 3 is a longitudinal view in section showing certain details of construction of a timer mechanism for controlling the delivery apparatus;

Figure 6:
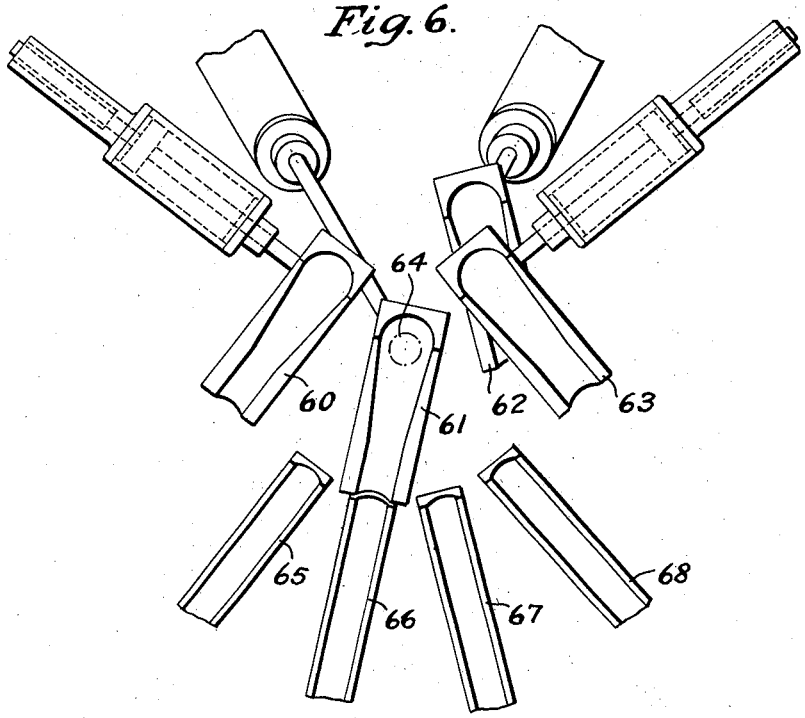
Figure 7:
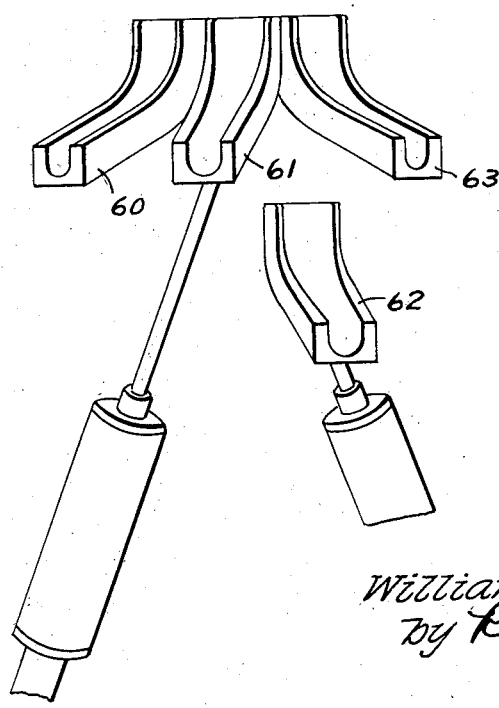

Figs. 4 and 5 are views in section showing details of the timer valve structure, the sections being taken on lines 4 and 5, respectively, of Fig. 3;

Fig. 6 is a diagrammatic view showing a modified arrangement for feeding four shaping machines, and Fig. 7 is a front elevational view of the apparatus illustrated in Fig. 6.

Figure 1:
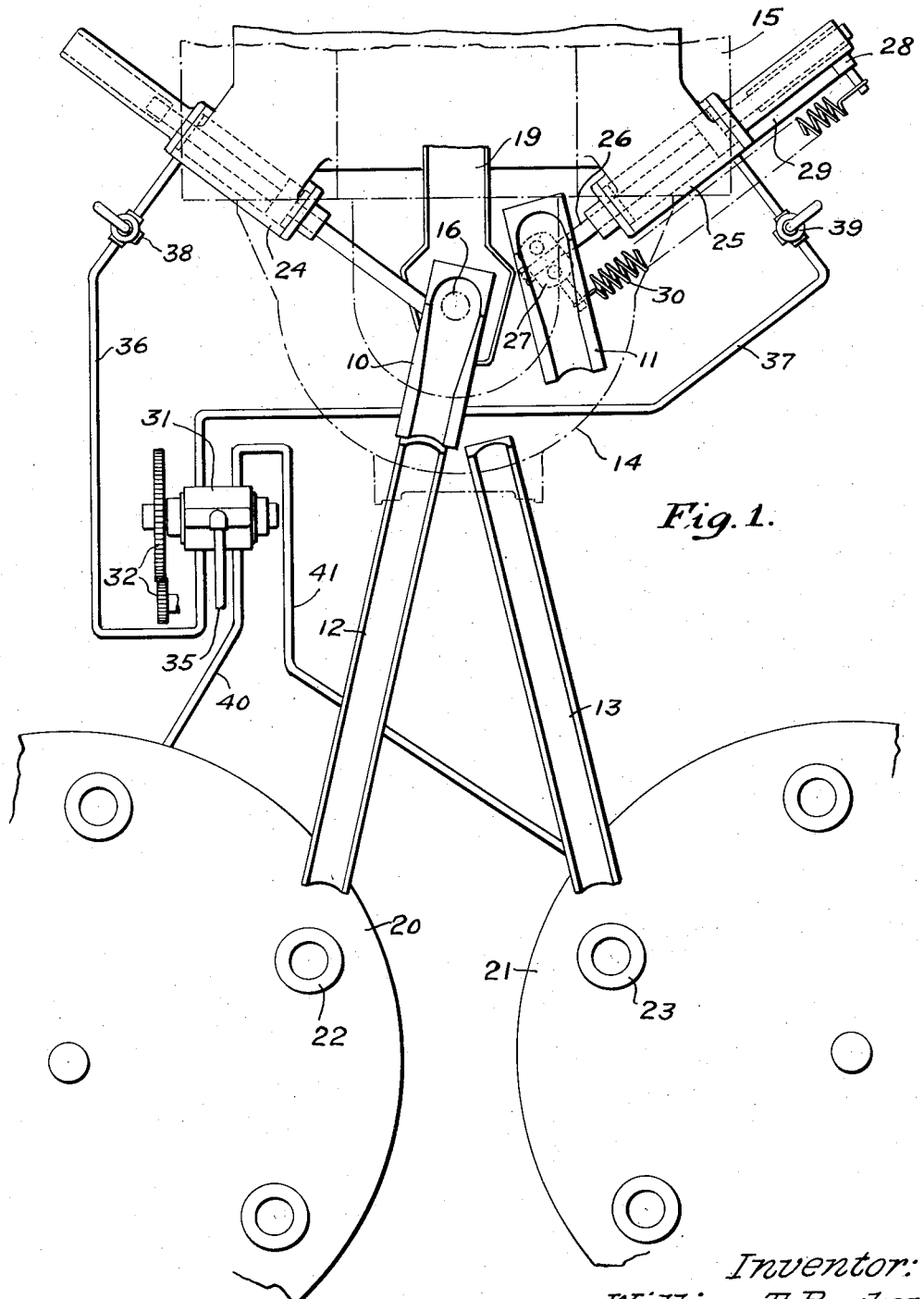
Figure 1 is a diagrammatic illustration of a glass delivery apparatus embodying my invention, as applied to the feeding of two shaping machines.

Referring to Fig. 1 of the drawings, there is illustrated a glass delivery apparatus embodying the present invention, in which two scoop blocks 10 and 11 are arranged to be moved laterally into and out of alignment with two inclined stationary delivery troughs 12 and 13 which are positioned to deliver mold charges to two shaping machines. Mold charges are delivered to the scoops by means of any suitable glass feeder, such as that indicated by the numeral 14, Fig. 2, in which a forehearth 15, connected to a glass melting tank, not shown, is provided with a discharge outlet 16 and in which the discharge of glass from the outlet is regulated by means of a plunger 17 to form mold charges of the desired size and shape which are severed by shears 18. The feeder above described is substantially of the type illustrated and described in a patent to Karl E. Peiler, No. 1,760,254, dated May 27, 1930, to which reference may be made for a more detailed description of these charge-forming instrumentalities, which form no part of the present invention.

When a scoop fails to receive its mold charge from the feeder for any reason, the charge is discharged into a suitable cullet receptacle 19 without disturbing the operation of the feeder.

The shaping machines may be of any desired type, and for the purpose of illustrating the invention, two rotary machines are indicated by the numerals 20 and 21 and may be of the intermittently-operated type. As shown, each of the machines is provided with a plurality of molds 22 and 23, respectively, to which mold charges are supplied by the stationary troughs 12 and 13 leading from the glass feeder. The molds may be provided with any suitable means for deflecting the mold charges from the troughs into the molds as they are presented to the troughs.

As heretofore pointed out, the delivery scoops are arranged about the feeder outlet on movable supports and the support for each scoop comprises an independently-operated fluid pressure cylinder. As shown in the illustrated embodiment of the invention, the scoop blocks 10 and 11 are supported on the piston rods of operating cylinders 24 and 25, respectively. The scoop block 11, for example, is fixedly mounted upon a piston rod 26 extending through the supporting cylinder 25 which may be mounted on the feeder frame. The scoop block 11 is secured to the piston rod in any suitable manner, as for example, by a clamp mechanism as indicated at 27. The rearward extension of the piston is provided with a pin 28 which operates in a slot 29 in the cylinder support, thereby maintaining the scoop in fixed alignment during its lateral movement toward and from the feeder outlet. Fluid pressure is only admitted to the cylinder 25 to move the piston 26 in one direction, and when the pressure is released, the piston is retracted by a spring 30 connecting the scoop and the cylinder in any suitable manner. This construction provides a simple means whereby the scoop block is maintained in an inoperative position when it is desired to stop the delivery of mold charges to a particular machine, or when the fluid pressure fails for any reason.

The distribution of fluid pressure to the several cylinders is controlled by a timing device, which is driven by the feeder. The timer mechanism is provided with certain adjustments whereby the time at which the several shaping machines may be tripped off or otherwise put into operation may be synchronized with the movements of the delivery mechanism. This timer mechanism comprises a novel rotary timing device 31 mounted on the feeder and operated by gearing 32 which connects directly to the feeder mechanism. The driving mechanism for the several feeder instrumentalities is indicated by gear 33 which is driven from any convenient source of power, as for example, an electric motor indicated by the numeral 34.

By thus gearing the timer direct to the feeder, I am enabled to control accurately the operation of the delivery mechanism and the shaping machines in proper timed relation with the formation of the mold charges to be subsequently delivered to the molds of the shaping machines.

An arrangement of conduits for distributing fluid pressure to the cylinders 24 and 25 is illustrated in Fig. 1, in which the numeral 35 indicates a conduit for admitting fluid to the timer from a source of constant pressure. Fluid is conducted to the scoop-operating cylinder 24 by means of conduit 36, and similarly, conduit 37 admits fluid to the cylinder 25 for operating the scoop 11. The conduits 36 and 37 are provided with cut-off valves 38 and 39, respectively, which provide manual means for stopping the operation of either of the scoops.

Conduits 40 and 41 lead to shaping machines 20 and 21 respectively, and it is contemplated that fluid pressure distributed to these machines may be applied in any suitable manner, as for example, by operating a trip-off mechanism which may be a clutch, latch, electric switch or other well-known mechanism adapted to control the period at which the molds are moved into glass-receiving position beneath the stationary delivery trough. Such a timing device is particularly desirable when the shaping machines are driven by independent mechanism, and are intermittently stopped in order to receive the mold charge.

The timing mechanism 31 for controlling the operation of the delivery mechanisms and the shaping machines is of the rotary valve type and comprises a cylindrical casing member 42 provided with apertures adapted to connect with the several conduits, as shown in Fig. 3. The rotary valve member includes separate rotor sections 43 and 44 which are secured to a common shaft 45 by any suitable means, as for example, by clamping screws 46 and 47, respectively. The shaft 45 is rotated by the driving gear 32 which is connected directly to the feeder drive mechanism as hereinbefore mentioned.

Referring to the details of construction shown in Figs. 3, 4 and 5, the two rotor sections are separate and form an annular inlet port 49 which receives motive fluid from the source of supply and distributes the same to ports disposed in the circumference of the rotor sections. The rotor section 43 is provided with a port 50 which is shown as a hole terminating in a groove on the circumference of the rotor section and this port is shown in position to admit fluid to the conduit 36 and thereby move the scoop block 10 to receive a mold charge, as shown in Fig. 1.

While the port 50 is thus admitting fluid to the cylinder 24 for operating scoop 10, a similarly constructed port 48 is in exhaust position to relieve the pressure in conduit 37 and cylinder 25, and permit the attached scoop 11 to be retracted to non-delivery position by its associated spring. The relation of the ports 48 and 50 is shown in Fig. 4. Simultaneous with this operation, the ports in rotor section 44 for controlling the operation of the trip-off mechanisms for the associated shaping machines are being operated. As shown, a port 51 is shown in position to admit fluid to conduit 40 to actuate machine 20, and port 52 is in position to exhaust fluid from conduit 41 leading from the mechanism for operating machine 21. The relative positions of these circumferential ports are shown in Fig. 5.

By providing separate valve rotor members for independently controlling the admission of fluid pressure to the glass-delivery mechanism and to the shaping-machine control mechanism, I am enabled to regulate the instant at which the delivery scoops are presented to the feeder outlet to receive a mold charge. When this period of operation is established, the rotor section 44 for controlling the instant at which the shaping machine is tripped off or otherwise actuated, may be angularly adjusted relative to the previously adjusted section 43, so as to cause the shaping machine to be actuated at the proper intervals to receive its charges from the delivery mechanism. There being several pneumatically-operated scoop blocks, it is essential that the timer cause a delivery scoop to be moved into position beneath the feeder outlet to receive a mold charge when severed by the shear mechanism and that, at substantially the same instant, a mold on the shaping machine be positioned relative to an associated trough to receive the charge. It may happen that the period of delivery of successive mold charges is not equal and in such cases it is necessary to time each machine to its corresponding delivery mechanism.

A modification of the invention is illustrated in Figs. 6 and 7 in which four piston-operated scoop blocks 60, 61, 62 and 63 are disposed about a feeder outlet indicated at 64. In this embodiment of the invention, two fluid-pressure cylinders, carrying the scoop blocks 60 and 63 are spaced laterally from the feeder outlet and two cylinders for operating the scoop blocks 61 and 62 are located below the outlet and inclined from the vertical position. These cylinders are arranged to periodically move the scoops to position beneath the feeder outlet and into alignment with cooperating stationary troughs 65, 66, 67 and 68, and thus deliver mold charges to the several shaping machines. It is contemplated that the scoop cylinders shall be timed to operate in any desired sequence to receive mold charges from the feeder, according to the principles described above in connection with the feeding of two machines.

Variations in the construction and arrangement of parts may be made within the scope of my invention, as set forth in the appended claims.

I claim as my invention:

1. Apparatus for delivering mold charges of molten glass from a glass feeder to a mold, which comprises a delivery member adapted to be moved into and out of a glass delivering position between the feeder and the mold, and means operated by fluid pressure for giving the delivery member translatory transverse movement from its non-delivery position to a position to receive a mold charge from the feeder outlet and to deliver the mold charge to said mold.

2. Apparatus for delivering mold charges of molten glass from a glass feeder to a mold, which comprises a delivery member, and means operated by fluid pressure for giving the delivery member translatory movement transversely of itself from a non-delivery position in which the delivery member is out of alignment with both the feeder and the mold to a position in alignment with both to receive a mold charge from the feeder outlet and to deliver the mold charge to said mold.

3. Apparatus for delivering mold charges of molten glass in succession from a glass feeder to a plurality of different molds, which comprises a delivery member adapted to be moved into and out of a glass delivering position, between the feeder and the molds, and means for giving the delivery member translatory transverse movement from its non-delivery position to a position to receive mold charges from the feeder outlet and to deliver the mold charges to said molds in succession.

4. Apparatus for delivering charges of molten glass from a glass feeder to a mold comprising a table upon which the mold is mounted, a delivery member adapted to be moved into and out of a glass delivering position between the feeder and the mold, a movable support for the delivery member mounted independently of said mold table, and means for moving the support bodily to move the delivery member laterally between its non-delivering position out of alignment with the feeder outlet and with the mold to its glass delivering position in alignment with the feeder outlet and with the mold to deliver a mold charge to the mold.

5. Apparatus for delivering mold charges of molten glass from a glass feeder to a plurality of inclined troughs positioned adjacent to the feeder, comprising a plurality of movably supported scoop blocks disposed adjacent to the feeder outlet and means for causing translatory movements of the respective scoop blocks in succession into and out of alignment with the feeder outlet and with the respective troughs.

6. Apparatus for delivering mold charges of molten glass from a glass feeder to an inclined trough positioned adjacent to the feeder, comprising a scoop block located between the feeder and the trough, a fluid-operated piston for movably supporting and guiding the scoop block bodily in a direction lateral of said scoop block and into alignment with the feeder outlet and with a designated trough, and other means for returning said scoop block to its original position after each piston actuated movement thereof.

7. Apparatus for delivering mold charges of molten glass from a glass feeder to an inclined trough positioned adjacent to the feeder, comprising a scoop block located between the feeder and the trough, a fluid-operated piston for supporting and guiding the scoop block, means for actuating the piston to move said scoop laterally and into alignment with the feeder outlet and with the trough, and resilient means for retracting the scoop block to a non-delivery position.

8. Apparatus for delivering mold charges of molten glass from a glass feeder to an inclined trough positioned adjacent to the feeder, comprising a scoop block located between the feeder and the trough, a movable support for the scoop block, a fluid-pressure mechanism for moving the support and for thereby causing the scoop block to move into alignment with the feeder outlet and with the trough, and resilient means for retracting the scoop block and its support to a position in which the scoop block is out of alignment with both the feeder outlet and the trough.

9. The combination with a glass feeder adapted to periodically deliver mold charges severed in suspension from a source of molten glass supply and a plurality of shaping machines, of a plurality of scoop blocks, each supported for translatory lateral movement to and from a position to receive a falling mold charge and to deliver it to a particular shaping machine and means operated by the feeder for synchronizing the movements of the scoop blocks with the feeder so that the respective scoop blocks are moved successively to their mold charge receiving and delivering positions and each scoop block is moved to its mold charge receiving and delivering position at the time of severance of the mold charge that is to be received therein.

10. Apparatus for delivering mold charges of molten glass from a glass feeder, comprising an inclined trough positioned adjacent to the feeder, a scoop block movable to bring one end thereof into position for receiving a charge of molten glass and to simultaneously bring the glass conveying surface of the other end into alignment with the glass conveying surface of said trough, and means for moving said scoop into glass-receiving position.

11. Apparatus for delivering mold charges of molten glass from a glass feeder to a plurality of inclined troughs positioned adjacent to the feeder, comprising a plurality of scoop blocks, each movable to bring one end thereof into position for receiving charges of molten glass and to simultaneously bring the glass conveying surface of the other end thereof into alignment with the glass conveying surface of one of said troughs, and means for successively moving said scoop blocks into glass-receiving positions.

12. Apparatus for delivering mold charges of molten glass from a glass feeder to a plurality of forming machines, comprising a plurality of troughs, each trough adapted to be moved laterally into and away from a position to receive a charge of glass from the feeder, spring operated means tending to hold each trough away from said receiving position, pneumatic means for moving said troughs successively into charge-receiving position, and means for receiving the charges when none of the troughs have been moved by the pneumatic means into charge-receiving position.

Signed at Hartford, Conn., this 9th day of April, 1926.

WILLIAM T. BARKER, Jr.